United States Patent
Giesman et al.

[15] 3,635,587
[45] Jan. 18, 1972

[54] BLADE COOLING LINER

[72] Inventors: Richard C. Giesman; Ronald P. Schwedland, both of Indianapolis, Ind.

[73] Assignee: General Motors Corporation

[22] Filed: June 2, 1970

[21] Appl. No.: 42,677

[52] U.S. Cl....................................................416/97, 416/224
[51] Int. Cl.............................................................F01d 5/18
[58] Field of Search..................416/96, 97, 90, 231, 92, 224; 415/115

[56] References Cited

UNITED STATES PATENTS 3,075,744  1/1963  Peterson...............................415/115
3,388,888  6/1968  Kercher et al.........................415/115
2,853,272  9/1958  Odds.........................................416/90

Primary Examiner—Everette A. Powell, Jr.
Attorney—Paul Fitzpatrick and Jean L. Carpenter

[57] ABSTRACT

A sheet metal liner for an internally air-cooled turbine blade is of generally airfoil shape and is spaced from the interior of the hollow blade by bosses extending from the blade wall. The liner is closed at its edge toward the trailing edge of the blade and is partially closed at its forward edge. At the forward edge, a row of nozzles to jet cooling air against the interior of the leading edge of the blade is defined by two strips of sheet metal bonded together having grooves etched into their abutting faces, which grooves are registered to define nozzles of converging configuration.

6 Claims, 6 Drawing Figures

PATENTED JAN 18 1972

3,635,587

INVENTORS
Richard C. Giesman, &
BY Ronald P. Schwedland

Paul Fitzpatrick
ATTORNEY

BLADE COOLING LINER

The invention herein described was made in the course of work under a contract or subcontract thereunder with the Department of Defense.

Our invention relates to cooling arrangements for internally cooled airfoils such as nozzle vanes and rotor blades for gas turbines, for example.

It is known to cool hollow turbine airfoils by circulating cooling air between the interior wall of the airfoil and a liner conforming generally to the interior of the airfoil but spaced from it to provide a path for circulation of air. It is also known to jet cooling air from a liner against the interior of the leading edge of the airfoil to improve convection at this location, which is rather critical from the standpoint of cooling. Preferably, the liner should be a lightweight metal structure. So far as we are aware, no satisfactory solution has been found prior to our invention to the problem of providing the nozzle structure in the leading edge of a cooling liner of the type described.

Briefly, in its preferred embodiment, our invention provides a blade liner in which two strips of sheet metal are bonded together and bonded between the leading edges of the walls of the liner, these strips having grooves extending across them and registering so as to define a row of nozzles each defined in part by one of the grooves in each of these strips.

The principal objects of our invention are to provide an improved means for cooling turbine airfoils, particularly to provide improved means for impingement cooling of such airfoils, and, more generally, to improve the efficiency and reliability of high-temperature turbomachinery.

The nature of our invention and its advantages will be apparent to those skilled in the art from the succeeding detailed description of the preferred embodiment of the invention taken in connection with the accompanying drawings thereof.

Figure 1:
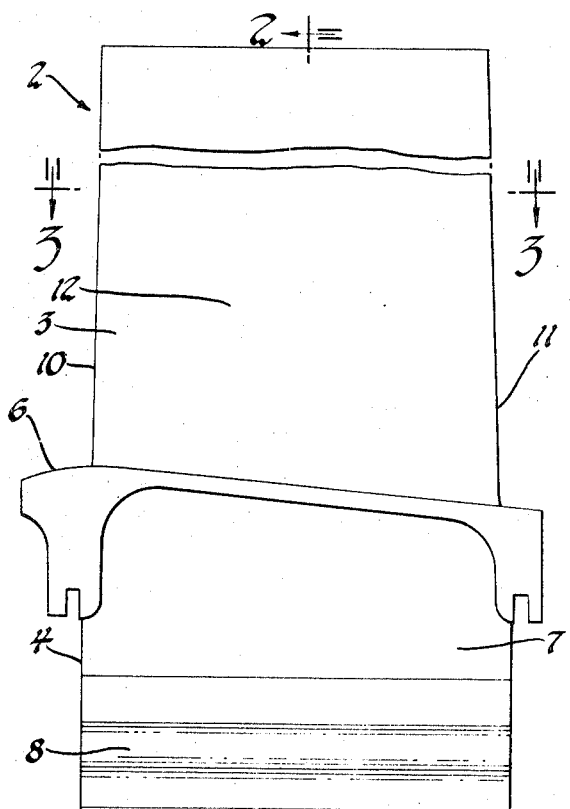
FIG. 1 is a side or face view of a turbine blade.
Figure 2:
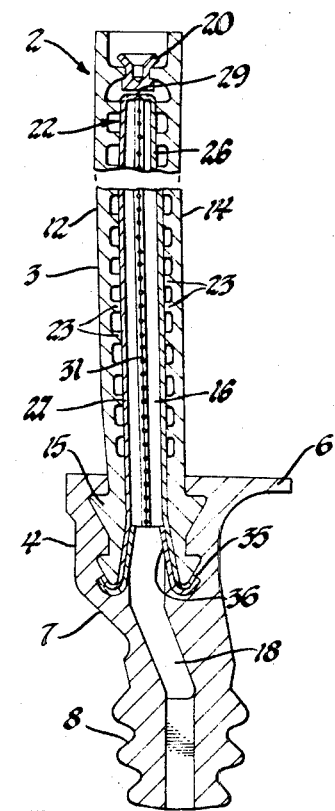
FIG. 2 is a cross-sectional view of the same taken on the plane indicated by the line 2—2 in FIG. 1.
Figure 3:
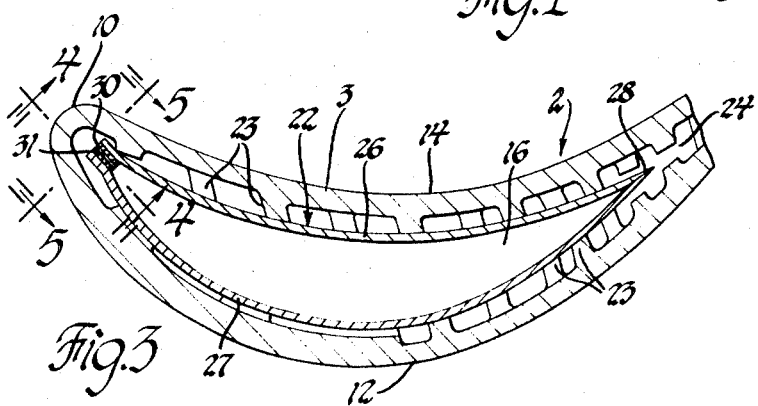
FIG. 3 is a cross-sectional view of the same taken on the plane indicated by the line 3—3 in FIG. 1.

Referring first to FIGS. 1, 2, and 3, a turbine rotor blade 2 comprises an airfoil 3 and a base 4. The base includes a platform 6, a stalk 7, and a root 8 shown as of the multiple dovetail type.

The airfoil is of a suitable streamlined cambered form having a leading edge 10, a trailing edge 11, a convex face 12, and a concave face 14. The airfoil includes a serrated foot 15 providing anchorage to the base, the base being bicast around the foot portion of the airfoil. The airfoil is hollow to define an internal passage or space 16 and the base defines a passage 18 by which cooling air is supplied to the interior of the airfoil. The outer end of the airfoil is closed by a plug 20 which may be analogous to a rivet including flared flanges. While a rotor blade is shown, the airfoil could be a nozzle vane, so far as our invention is concerned.

A sheet metal liner structure 22 of roughly the same overall contour as the airfoil 3 is disposed within the space 16. The inner surfaces of the walls of the airfoil bear bosses 23 which project into the space 16 into contact with the liner, holding the liner in position and spacing it generally from the inner surface of the walls of the airfoil faces. A space or passage 24 leads to the trailing edge of the airfoil to discharge the cooling air through a slit or row of outlets at the trailing edge. Cooling air supplied from any suitable source flows through the passage 18 into the space 16 within the liner, is discharged from the liner, and flows between the liner and the inside of the walls of the airfoil and out the trailing edge.

Figure 4:
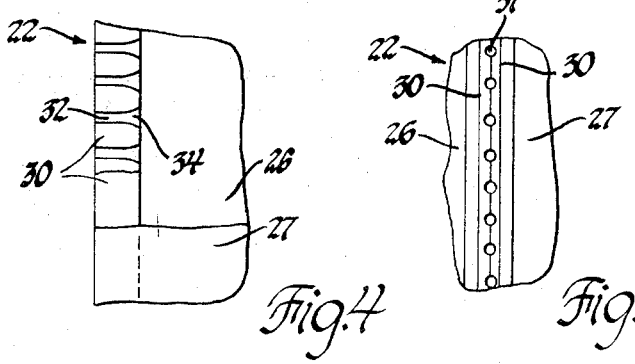
FIG. 4 is a fragmentary sectional view of the liner taken on the plane indicated by the line 4—4 in FIG. 3.
Figure 5:
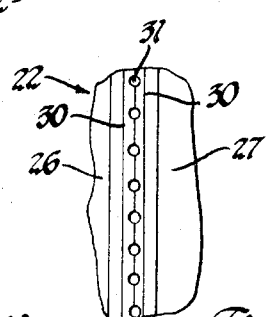
FIG. 5 is a fragmentary elevational view of the liner taken in the plane indicated by the line 5—5 in FIG. 3.
Figure 6:
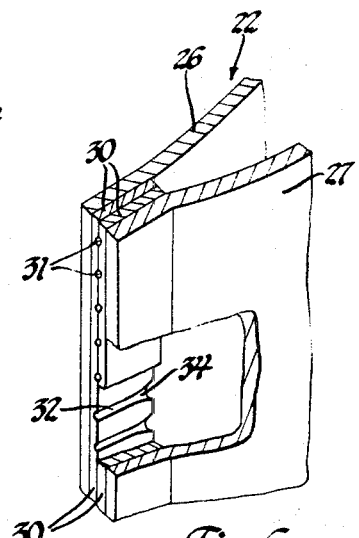
FIG. 6 is a fragmentary axonometric view of the liner.

As indicated above, our invention is concerned particularly with the structure of the blade liner. This liner is a tubular structure, generally of airfoil configuration, defined by a concave sheet metal wall 26 and a convex sheet metal wall 27, these being brazed, welded, diffusion bonded, or otherwise fixed together at the trailing edge of the liner as indicated at 28. The outer end of the liner is closed, as indicated at 29. Referring also to FIGS. 4, 5, and 6, the leading edge portions of the walls 26 and 27 are formed so as to be parallel and slightly spaced apart and two sheet metal strips 30 are secured to each other and secured to the walls 26 and 27 at the leading edge to define a unitary structure by any suitable process such as diffusion bonding, electron beam welding, brazing, or the like, depending upon choice and the nature of the material. The strips 30 define a row of nozzles 31 directed generally perpendicularly to the span of the airfoil against the interior of the leading edge of the airfoil. Each nozzle 31 is defined by a pair of registering grooves 32 in the abutting faces of the strips 30. The grooves 32 may be formed in the strips by a suitable process such as photochemical etching or electric machining. Because of the way the nozzles are made by cutting the grooves in the separate strips, the nozzles may readily be made of very small size; they may be spaced as desired very readily; and, more important, they may have a form which leads to greater efficiency in jetting of the coolant to the leading edge. It is noted, as shown clearly in FIGS. 4 and 6, that the rear or entrance portion of each nozzle is flared as indicated at 34 due to an increase in depth and width of the groove 32. The grooves 32 may be kept clear when the strips 30 are bonded together by filling them with any suitable stop off. Since the nozzles are of considerable length, as distinguished from mere orifices, smooth flow and elimination of contraction of flow beyond the outlet are attained. Preferably, each nozzle is about three diameters in length.

The retention of the nozzle in the rotor blade illustrated in FIGS. 1 and 2 must resist centrifugal force. As shown clearly in FIG. 2, the radially inner end of the liner 22 is open at the leading and trailing edges within the foot 15 and the extreme inner ends are recurved into hooks 35 which bear against the inner end of the foot 15. Preferably, an additional reinforcing layer 36 is bonded to the liner wall at this point for greater strength. With this structure, the liner is put in place before the base is bicast onto the airfoil.

It will be apparent that this liner is very readily made, the parts being formed by usual sheet metal forming processes in a die. After the sheet metal parts are formed and the grooves 32 are made in the strips 30, it is a relatively simple matter to mount them in a suitable holding fixture and bond or braze or otherwise fix them into the unitary liner structure. This liner may then be simply pushed into the airfoil and is anchored when the base is cast to it.

Because of the converging configuration and length of the nozzles, there is better utilization of the cooling air as a jet to scour the inside of the leading edge and improve the convection of heat from the leading edge. The cooling air, after impinging the leading edge, flows toward the trailing edge of the blade between the liner and the airfoil faces, cooling at this point being aided by the bosses 23 on the inside of the airfoil walls. The cooling air finally is discharged in conventional manner from the trailing edge of the airfoil.

No discussion of materials or metallurgy is made here since these may follow the state of the art. The scale ordinarily is small. The sheets 26 and 27 and strips 30 may preferably be about 0.01 inch thick.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. A blade liner for insertion into a hollow airfoil for circulating cooling fluid within the airfoil comprising two sheet metal walls joined together at the edges to provide a tubular structure conforming generally to the interior cavity of the airfoil, the liner also comprising two sheet metal strips disposed between the walls at the leading edge of the liner, the walls and strips being bonded together into a laminated structure, each strip having a row of grooves each extending across the inner face of the strip, with each groove aligned with a groove in the abutting strip, each aligned pair of grooves being configured to define a nozzle for discharging a jet of cooling fluid from the liner.

2. A blade liner for insertion into a hollow airfoil for circulating cooling fluid within the airfoil comprising two sheet metal walls joined together at the edges to provide a tubular structure conforming generally to the interior cavity of the airfoil, the liner also comprising two sheet metal strips disposed between the walls at the leading edge of the liner, the walls and strips being bonded together into a laminated structure, each strip having a row of grooves each extending across the inner face of the strip and each converging toward the leading edge, with each groove aligned with a groove in the abutting strip, each aligned pair of grooves being configured to define a converging nozzle for discharging a jet of cooling fluid from the liner.

3. A liner as recited in claim 2 in which each nozzle has a length at least as great as its minimum diameter.

4. A liner as recited in claim 3 in which the length of each nozzle is at least several times its minimum diameter.

5. A cooled flow-directing member for a high-temperature turbomachine comprising, in combination, a hollow airfoil with leading and trailing edges and two faces extending from the leading edge to the trailing edge, a hollow liner mounted within and extending spanwise of the airfoil, means for conducting a cooling fluid into the liner, means spacing the liner from the interior of the airfoil to define cooling fluid passages extending between each face and the liner from near the leading edge to near the trailing edge, and means defining a cooling fluid outlet at the trailing edge of the airfoil; the liner comprising two sheet metal walls disposed generally parallel to the blade faces and joined at the leading and trailing edges to provide a tubular generally airfoil-shaped structure and including two strips abutted between the walls at the leading edge of the liner, the walls and strips being bonded together into a laminated structure, each strip having a row of grooves each extending across the inner face of the strip, with each groove aligned with a groove in the abutting strip, each aligned pair of grooves being configured to define a nozzle for discharging a jet of cooling fluid from the liner against the inner surface of the airfoil leading edge.

6. A combination as recited in claim 5 in which the grooves and nozzles converge toward the leading edge.

* * * * *